(12) United States Patent
Wang et al.

(10) Patent No.: US 8,902,884 B2
(45) Date of Patent: Dec. 2, 2014

(54) MCCH NOTIFICATION SCHEDULING AND CONTENTS

(75) Inventors: Peter S. Wang, East Setauket, NY (US); Sung-Hyuk Shin, Northvale, NJ (US); Stephen E. Terry, Northport, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 290 days.

(21) Appl. No.: 12/856,444

(22) Filed: Aug. 13, 2010

(65) Prior Publication Data

US 2011/0194428 A1 Aug. 11, 2011

Related U.S. Application Data

(60) Provisional application No. 61/233,905, filed on Aug. 14, 2009, provisional application No. 61/255,154, filed on Oct. 27, 2009.

(51) Int. Cl.
*H04L 12/50* (2006.01)
*H04W 72/00* (2009.01)

(52) U.S. Cl.
CPC .................................. *H04W 72/005* (2013.01)
USPC ............................ 370/384; 312/324; 312/350

(58) Field of Classification Search
USPC ........................... 370/252, 312, 384, 324, 350
See application file for complete search history.

(56) References Cited

U.S. PATENT DOCUMENTS

| | | | | |
|---|---|---|---|---|
| 7,450,545 B2 * | 11/2008 | Kim et al. | ...................... | 370/331 |
| 7,864,722 B2 * | 1/2011 | Yi et al. | ........................ | 370/312 |
| 7,949,299 B2 * | 5/2011 | Rudolf et al. | ................. | 455/3.06 |
| 8,139,524 B2 * | 3/2012 | Lee et al. | ....................... | 370/328 |
| 8,144,735 B2 * | 3/2012 | Vayanos et al. | ............... | 370/522 |
| 8,155,675 B2 * | 4/2012 | Iwamura et al. | .............. | 455/458 |
| 8,254,299 B2 * | 8/2012 | Kim | .............................. | 370/312 |
| 8,270,332 B2 * | 9/2012 | Aoyama et al. | ............... | 370/312 |
| 2006/0030342 A1 * | 2/2006 | Hwang et al. | ................. | 455/466 |
| 2006/0223544 A1 * | 10/2006 | Lee et al. | ....................... | 455/450 |
| 2008/0045224 A1 * | 2/2008 | Lu et al. | ......................... | 455/446 |
| 2009/0275368 A1 * | 11/2009 | Wang et al. | ................... | 455/574 |
| 2010/0022257 A1 * | 1/2010 | Koskela | ........................ | 455/458 |
| 2010/0189027 A1 * | 7/2010 | Ishida et al. | .................. | 370/312 |

(Continued)

OTHER PUBLICATIONS

3rd Generation Partnership Project (3GPP), R2-093799, "MBMS Notification and UE Energy Consumption in LTE Rel-9", Ericsson, ST-Ericsson, 3GPP TSG-RAN WG2, Meeting #66bis, Los Angeles, Jun. 29-Jul. 3, 2009, 6 pages.

(Continued)

*Primary Examiner* — Ricky Ngo
*Assistant Examiner* — Dewanda Samuel
(74) *Attorney, Agent, or Firm* — Condo Roccia Koptiw LLP

(57) ABSTRACT

A multimedia broadcast multicast service (MBMS) may be transmitted from a wireless network and may be received by a wireless transmit/receive unit (WTRU). From the perspective of the WTRU, an MBMS control channel (MCCH) notification may be received over a physical downlink control channel (PDCCH). The PDCCH may include an MBMS radio network temporary identifier (M-RNTI) and the PDCCH may be on a multimedia broadcast on a single frequency network (MBSFN) subframe for MBMS. The MCCH notification may be monitored on the MBSFN subframe. The MCCH notification may be received periodically within a scheduling period for the MBSFN subframe. The MCCH notification may also be received in an MCCH message modification period that may occur prior to an MCCH message modification period that may include a new MCCH message.

18 Claims, 11 Drawing Sheets

(56) References Cited

U.S. PATENT DOCUMENTS

| | | | | |
|---|---|---|---|---|
| 2010/0279715 | A1* | 11/2010 | Alanara et al. | 455/458 |
| 2010/0323714 | A1* | 12/2010 | Schmidt et al. | 455/456.1 |
| 2012/0008543 | A1* | 1/2012 | Gou et al. | 370/312 |
| 2013/0070659 | A1* | 3/2013 | Gou et al. | 370/312 |

OTHER PUBLICATIONS $3^{rd}$ Generation Partnership Project (3GPP), R2-095359, "Report of 3GPP TSG RAN WG2 Meeting #66bis, Los Angeles, Jun. 29-Jul. 3, 2009", ETSI MCC, 3GPP TSG-RAN WG2, Meeting #67, Shenzhen, China, Aug. 4-8, 2009, 108 pages.

$3_{rd}$ Generation Partnership Project (3GPP), TS 36.211 V8.7.0, "$3^{rd}$ Generation Partnership Project: Technical Specification Group Radio Access Network; Evolved Universal Terrestrial Radio Access (E-UTRA); Physical Channels and Modulation (Release 8)", May 2009, 82 pages.

$3^{rd}$ Generation Partnership Project (3GPP), TS 36.300 V8.9.0, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", Jun. 2009, 159 pages.

$3^{rd}$ Generation Partnership Project (3GPP), TS 36.304 V8.6.0, "$3^{rd}$ Generation Partnership Project: Technical Specification Group Radio Access Network; Evolved Universal Terrestrial Radio Access (E-UTRA); User Equipment (UE) Procedures in Idle Mode (Release 8)", Jun. 2009, 30 pages.

$3^{rd}$ Generation Partnership Project (3GPP), TS 36.321 V8.6.0, "$3^{rd}$ Generation Partnership Project: Technical Specification Group Radio Access Network; Evolved Universal Terrestrial Radio Access (E-UTRA); Medium Access Control (MAC) Protocol Specification (Release 8)", Jun. 2009, 47 pages.

European Telecommunications Standards Institute (ETSI), TS 125.346 V8.3.0, Universal Mobile Telecommunications System (UMTS); Introduction of the Multimedia Broadcast/Multicast Service (MBMS) in the Radio Access Network (RAN); Stage 2 (3GPP TS 25.346 version 8.3.0 Release 8), Apr. 2009, 72 pages.

* cited by examiner

MCCH NOTIFICATION SCHEDULING AND CONTENTS

CROSS REFERENCE TO RELATED APPLICATIONS

This application claims the benefit of U.S. Provisional Application No. 61/233,905, filed Aug. 14, 2009, titled "MCCH NOTIFICATION SCHEDULING AND CONTENTS AND MCCH MESSAGE TRANSMISSION", and U.S. Provisional Application No. 61/255,154, filed Oct. 27, 2009, titled "MCCH NOTIFICATION SCHEDULING AND CONTENTS AND MCCH MESSAGE TRANSMISSION", the contents of both applications being hereby incorporated by reference in their respective entirety, for all purposes.

BACKGROUND

The multimedia broadcast/multicast service (MBMS) in the long term evolution (LTE) project is an internet protocol (IP) based multicast service that may allow for multiple mobile subscribers under the service coverage to receive the same service data at the same time. A benefit of MBMS may be that service data from a single source entity can be transmitted to multiple endpoints using the same, or common, radio channel facility. MBMS may be used extensively over wireless networks. In Long Term Evolution (LTE), in an evolved-universal mobile telephone system (UMTS) radio access network (E-UTRAN), MBMS may provide this capability as a unidirectional point to multipoint bearer service.

MBMS involve one or more successive multicast sessions. A multicast service may include a single on-going session (e.g. a multimedia stream) or may include several intermittent multicast sessions over an extended period of time (e.g. messages). Devices that receive multicast services may require multicast service session information and/or control information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Embodiments contemplate methods for receiving a multimedia broadcast multicast service (MBMS) at a wireless transmit/receive unit (WTRU). The method may include receiving an MBMS control channel (MCCH) notification over a physical downlink control channel (PDCCH). The PDCCH may include an MBMS radio network temporary identifier (M-RNTI) and the PDCCH may be on a Multimedia Broadcast on a Single Frequency Network (MBSFN) subframe for MBMS. The method may also include monitoring the MCCH notification on the MBSFN subframe.

Embodiments contemplate methods of receiving control information at a wireless mobile device. The method may comprise receiving, intermittently, an indication of a change in control information over a control channel. The control channel may include an identifier and the control channel may be may be a control channel for an LTE based system.

Embodiments contemplate an evolved node-B (eNB) that may be configured, at least in part, to transmit an MBMS control channel (MCCH) notification periodically over a physical downlink control channel (PDCCH) one or more times in an MCCH message modification period. The MCCH message modification period may occur prior to an MCCH message modification period that may include a new MCCH message. The PDCCH may include an MBMS-radio network temporary identifier (M-RNTI) and the PDCCH may be on a single frequency MBMS (MBSFN) subframe.

Embodiments contemplate an evolved node-B (eNB) that may be configured, at least in part, to transmit an MBMS control channel (MCCH) notification over a physical downlink control channel (PDCCH). The PDCCH may include an MBMS-radio network temporary identifier (M-RNTI), potentially with a downlink control information (DCI), and the PDCCH may be on an MBSFN subframe.

Embodiments contemplate a wireless transmit/receive unit (WTRU), that may be configured, at least in part, to receive an MBMS control channel (MCCH) notification periodically over a physical downlink control channel (PDCCH) one or more times in an MCCH message modification period. The MCCH message modification period may occur prior to an MCCH message modification period that may include a new MCCH message. The PDCCH may include an MBMS-radio network temporary identifier (M-RNTI), potentially with a DCI, and the PDCCH may be on an MBSFN subframe.

Embodiments contemplate a wireless transmit/receive unit (WTRU), that may be configured, at least in part, to receive an MBMS control channel (MCCH) notification over a physical downlink control channel (PDCCH). The PDCCH may include an MBMS-radio network temporary identifier (M-RNTI), potentially with a DCI, and the PDDCH may be on an MBSFN subframe.

Embodiments contemplate methods and apparatuses for MCCH control, including the message notification scheduling and the contents of the message. The MCCH notification (M-RNTI over physical downlink control channel (PDCCH)) may be transmitted over one or more MBSFN subframes. MCCH notification may be indicated as occasions in MBSFN subframes. WTRUs that may receive MBMS services may check, receive, and/or monitor MBSFN MCCH notification occasions. A WTRU in a connected state may check for a MCCH notification using the SFN mod (T div N)=0 frame occasions. MCCH notification may be sent in the one modification period (MP) before the new MCCH message may start in a new MP, and may stop in the new MP if there is no new MCCH message for the immediate next MP. MCCH notifications may have a value-tag corresponding to a MCCH message. The MCCH may be multiplexed with MTCHs over a MCH in a same MBSFN subframe.

Embodiments contemplate methods of receiving a multimedia broadcast multicast service (MBMS) at a wireless transmit/receive unit (WTRU). The methods may include receiving an MBMS control channel (MCCH) Notification over a physical downlink control channel (PDCCH) with a MBMS specific MBMS-radio network temporary identifier (M-RNTI). The embodiments also contemplate that the PDCCH may be on a non-single frequency MBMS (MBSFN) subframe or on a MBSFN-reserved subframe. The PDCCH may be received simultaneously with a paging radio network temporary identifier (P-RNTI). The MCCH notification transmit and receive frame/subframe occasions may occur following a paging occasion according to: system frame number (SFN) mod T=(T div N)*(WTRU_ID mod N) and i_s=floor (WTRU_ID/N) mod Ns, where T is a default paging cycle length, N is derived with N=min (T, Nb), and Nb and Ns are received by the WTRU. Embodiments also contemplate that a MCCH notification may occur in one or more MBSFN subframes. The MBSFN MCCH notification occasions may be monitored periodically.

Embodiments contemplate receiving a MCCH notification in a MBMS modification period (MP) prior to a period containing a new MCCH message. The MCCH notification may include a value-tag corresponding to an MCCH message. The MCCH notification may include a counter and the counter may be decremented for each MP.

Embodiments contemplate applying power to a wireless transmit receive unit (WTRU) and the WTRU may read and transmit a fixed parameter MCCH message. Embodiments also contemplate that an MCCH message may be multiplexed with an MBMS transport channel (MTCH) over a MBMS channel in one (perhaps the same) MBSFN subframe.

Embodiments contemplate that a control plane MBMS medium access control (MAC) service data unit (SDU) may be distinguished from a data plane MBMS MAC SDU. A single format may be applied for data plane and control plane medium access control (MAC) service data units (SDUs) and may be distinguished between control plane MAC SDUs and data plane SDUs with a bit in a header.

Embodiments contemplate that a WTRU in a Connected state may check for MCCH Notification using the relation SFN mod (T div N)=0 frame occasions and may be any of the Ns subframes, in order to use the WTRU DL active time, which may be the discontinuous reception (DRX) on-duration time plus the time when one or more active timers may be running when the WTRU may be in DRX mode.

Embodiments contemplate the MCCH Notification may have a value-tag corresponding to a MCCH message and the MCCH notification may have an MP-count-down counter, decremented with each MP and the MCCH message itself may contain the value-tag.

Embodiments contemplate that a fixed parameter MCCH message may be defined and transmission and reception procedures may be provided to facilitate newly powered-on WTRUs for acquiring MCCH message without reading an M-RNTI notification.

Embodiments contemplate that MCCH Notification content may include downlink control information (DCI) when on PDCCH with M-RNTI and the DCI content may indicate an MBMS-SIB change.

Embodiments contemplate that a MCCH message may be multiplexed with a MTCH over a Multicast Channel (MCH) in the same MBSFN subframe. Embodiments contemplate the MCCH message may contain MAC-PDU formats compliant to R9 MBMS process, a C/D field and separate c-plane/d-plane MBMS MAC-PDU headers that may include separate or combined C/D MAC-PDUs.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
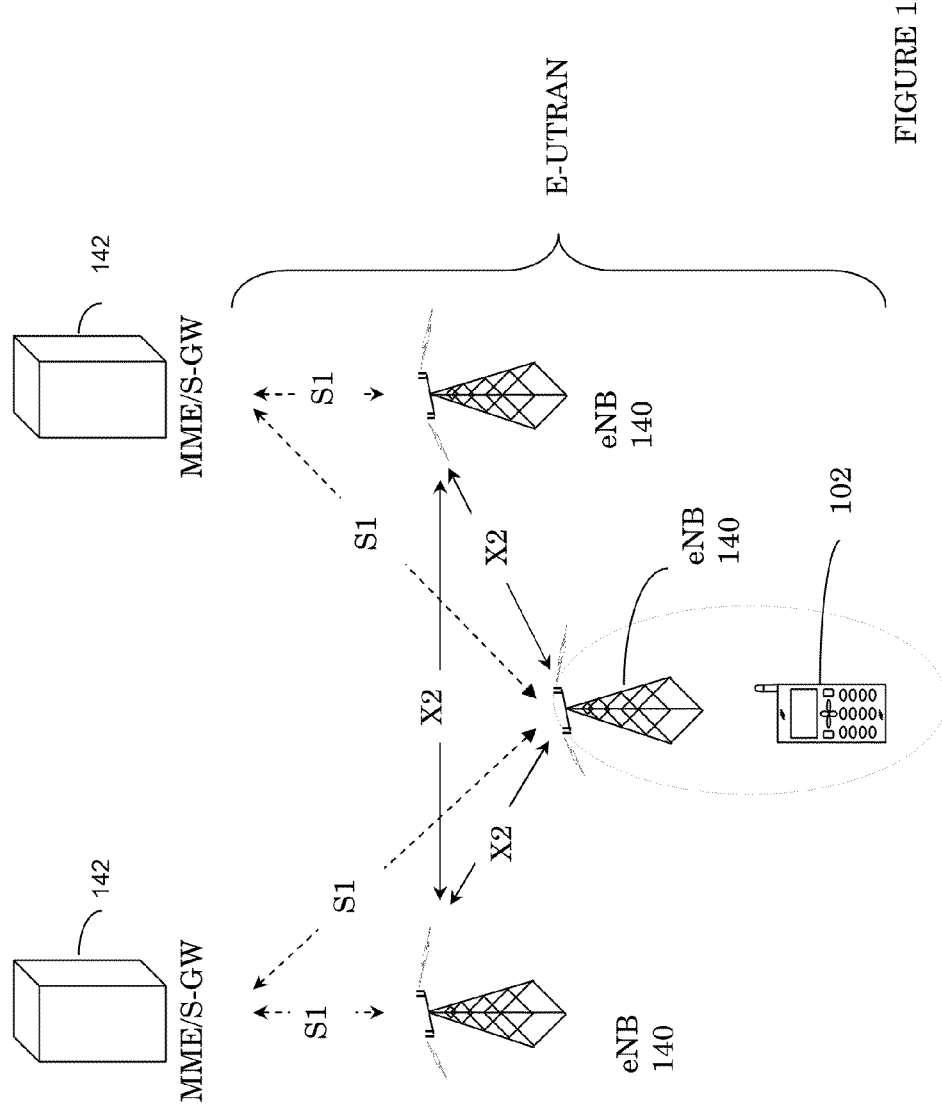
FIG. 1 illustrates a diagram of a wireless communication system/access network of Long Term Evolution (LTE) with which embodiments may be implemented.

A detailed description of illustrative embodiments will now be described with reference to FIGS. 1-8. Although this description provides a detailed example of possible embodiments, it should be noted that the details are intended to be exemplary and in no way limit the scope of disclosed embodiments.

Embodiments contemplate that variations of the MBMS services data may be carried over the LTE MBMS traffic channel (MTCH). The sessions of the MBMS services, their activation time and duration information and other control related information may be carried over by the LTE MBMS control channel (MCCH) as a MCCH message, for example. The data or messages on the MCCH and/or the MTCH may be transmitted over the specific time allocation of the MBSFN subframes. The WTRU may obtain control information from the MCCH message in order to know specific information describing the MBMS service reception the WTRU is interested in and has subscribed to before the WTRU tunes itself for the reception. Thus it is useful for the WTRU to receive the MCCH message about MBMS service and control information.

MBMS in LTE is not likely to be used for public warning systems. Also, the MBMS services and their service sessions may be scheduled over a long period of time. For at least these two reasons, the rate of the service session activation and the service control information change may not be very frequent (for example, the average change may come in about 20 seconds). Therefore, it may not be necessary and may not be power efficient for a WTRU to check the MCCH messages for newer service and control information very often. Thus, for efficiency reasons with respect to both the network and the WTRU, WTRUs may obtain the new MCCH messages when there is a real change in the MBMS service, session activation/duration, or other control information. For a WTRU that has recently powered up, the WTRU may obtain the current MCCH message that may be sent repeatedly in small intervals, defined as a MCCH message repetition period (RP), and then the WTRU may monitor the channel for changes.

Embodiments contemplate that a MCCH notification mechanism may be used, to aid the WTRU's 102 power saving and to reduce system signaling load, for example. The MCCH notification may be transmitted over a physical downlink control channel (PDCCH) with a special MBMS radio network temporary identifier (M-RNTI) that may be defined specifically for LTE MBMS. The MCCH notification may serve as the notice of an upcoming new MCCH message in the next MCCH message modification boundary, or period, (MP) for fresh MBMS service and control information. The MCCH message modification period (MP) may be a multiple of the MCCH message repetition period (RP), for example MP=N*RP.

The WTRU may check the MCCH notification periodically without reading and interpreting the MCCH message every time, which may be large in size and versatile in contents, and without the need to parse the large and versatile contents and determine if it contained a relevant change. Embodiments contemplate that the MBMS capable WTRU may avoid reading the MCCH message periodically to save power.

Embodiments contemplate that the MCCH notification scheduling methods and device configurations may support power saving and may have less operational impact on the WTRU reception. The MCCH notification contents and definitions with unicast control region space efficiency are contemplated. Transmission locations with respect to the MBSFN and/or non-MBSFN subframes are also contemplated. Embodiments also contemplate MCCH message transmission parameter definitions and reception method mechanisms which may benefit recently powered-on WTRUs, for which the MCCH notification may not be available immediately but MBMS reception may be needed nonetheless. Multiplexing of an MCCH message and multicast channel (MCH) data when they may be put on the same MBSFN subframe are also contemplated by embodiments.

When referred to hereafter, the terminology "wireless transmit/receive unit (WTRU)" may include, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" may include, but is not limited to, a Node-B, an evolved Node-B, a site controller, an access point (AP), or any other type of interfacing device capable of operating in a wireless environment.

FIG. 1 illustrates a diagram of a wireless communication system/access network of Long Term Evolution (LTE) 101, which may include an Evolved-Universal Terrestrial Radio Access Network (E-UTRAN) on which embodiments may be implemented. The E-UTRAN, as shown for example, may include a WTRU 102 and several evolved Node-Bs, (eNBs) 140. The WTRU 102 may communicate with one or more eNB 140. The eNBs 140 may interface with each other using an X2 interface, for example. The eNBs 140 may also be connected to a Mobility Management Entity (MME)/Serving Gateway(S-GW) 142, through an S1 interface, for example. Although a single WTRU 102 and three eNBs 140 are shown in FIG. 1, it should be apparent that any combination of wireless and wired devices may be included in the wireless communication system 101.

Figure 1A:
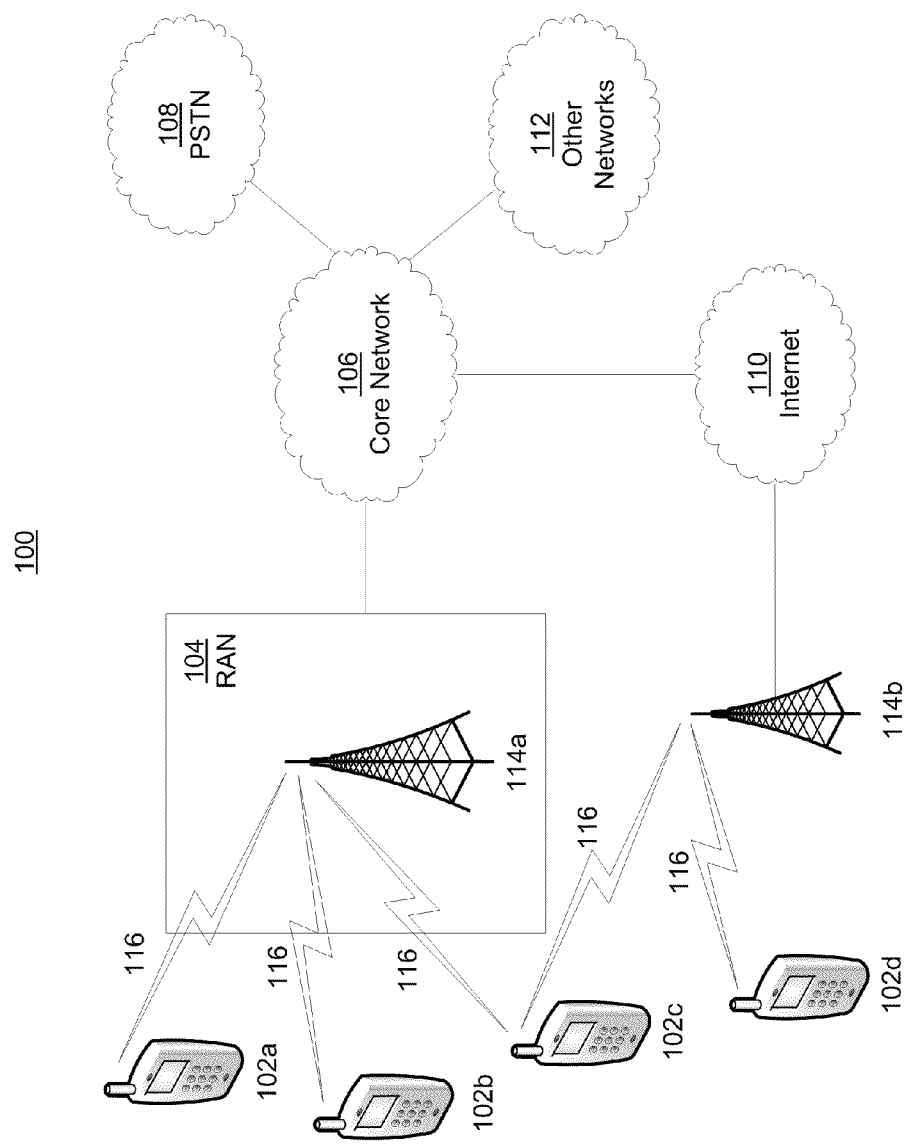
FIG. 1A is a system diagram of another example communications system in which one or more disclosed embodiments may be implemented.

FIG. 1A is a diagram of another example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102 or 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
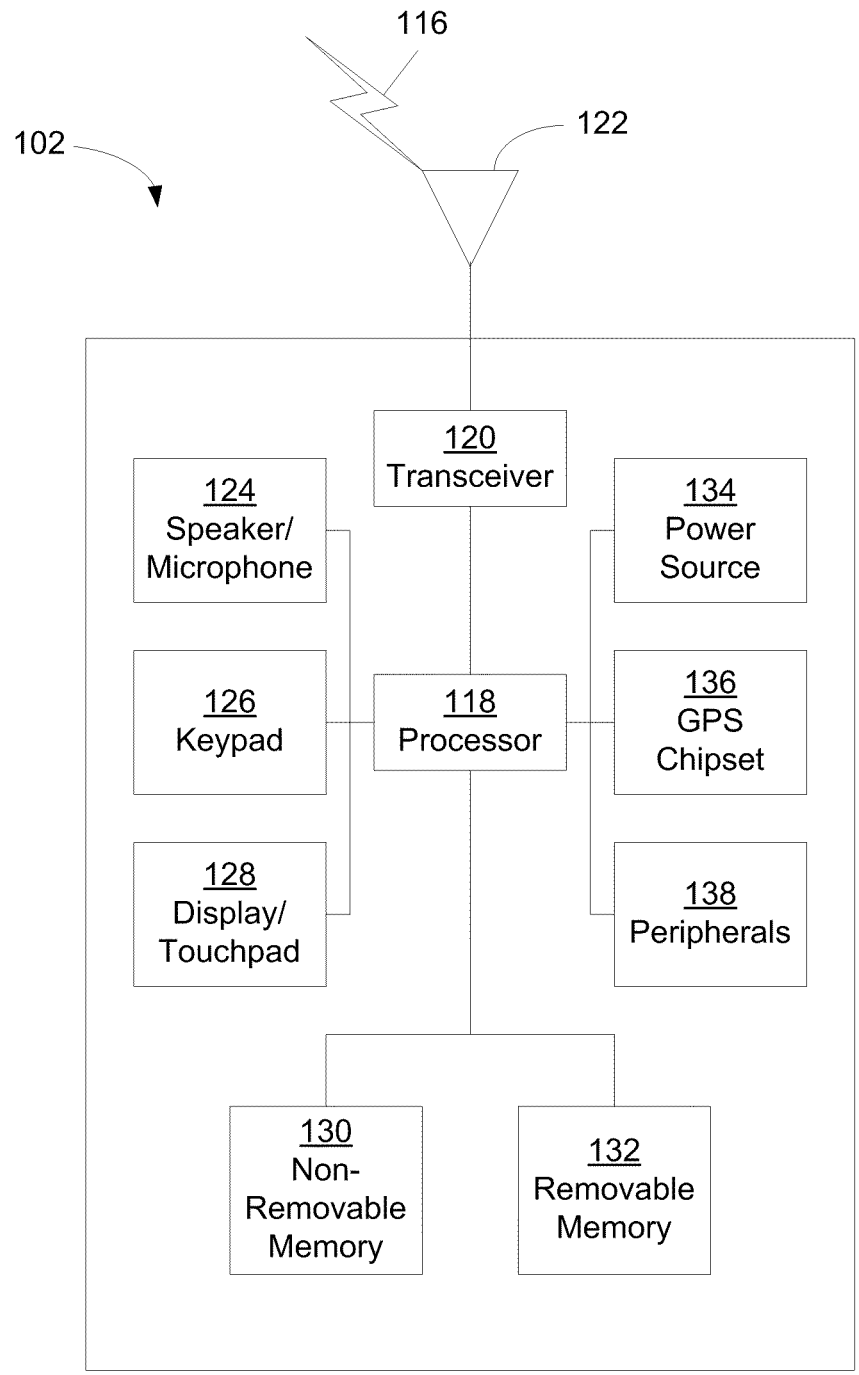
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
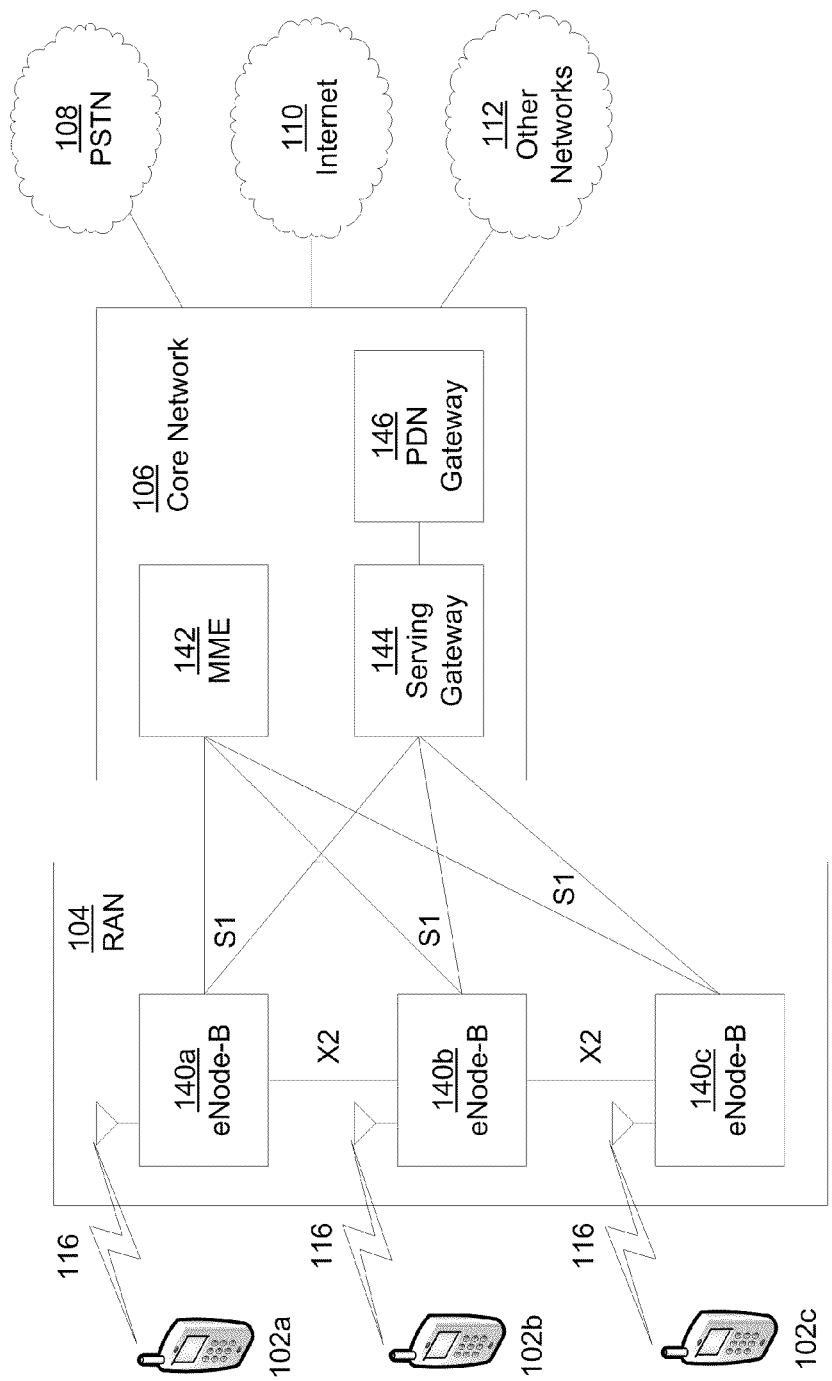
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
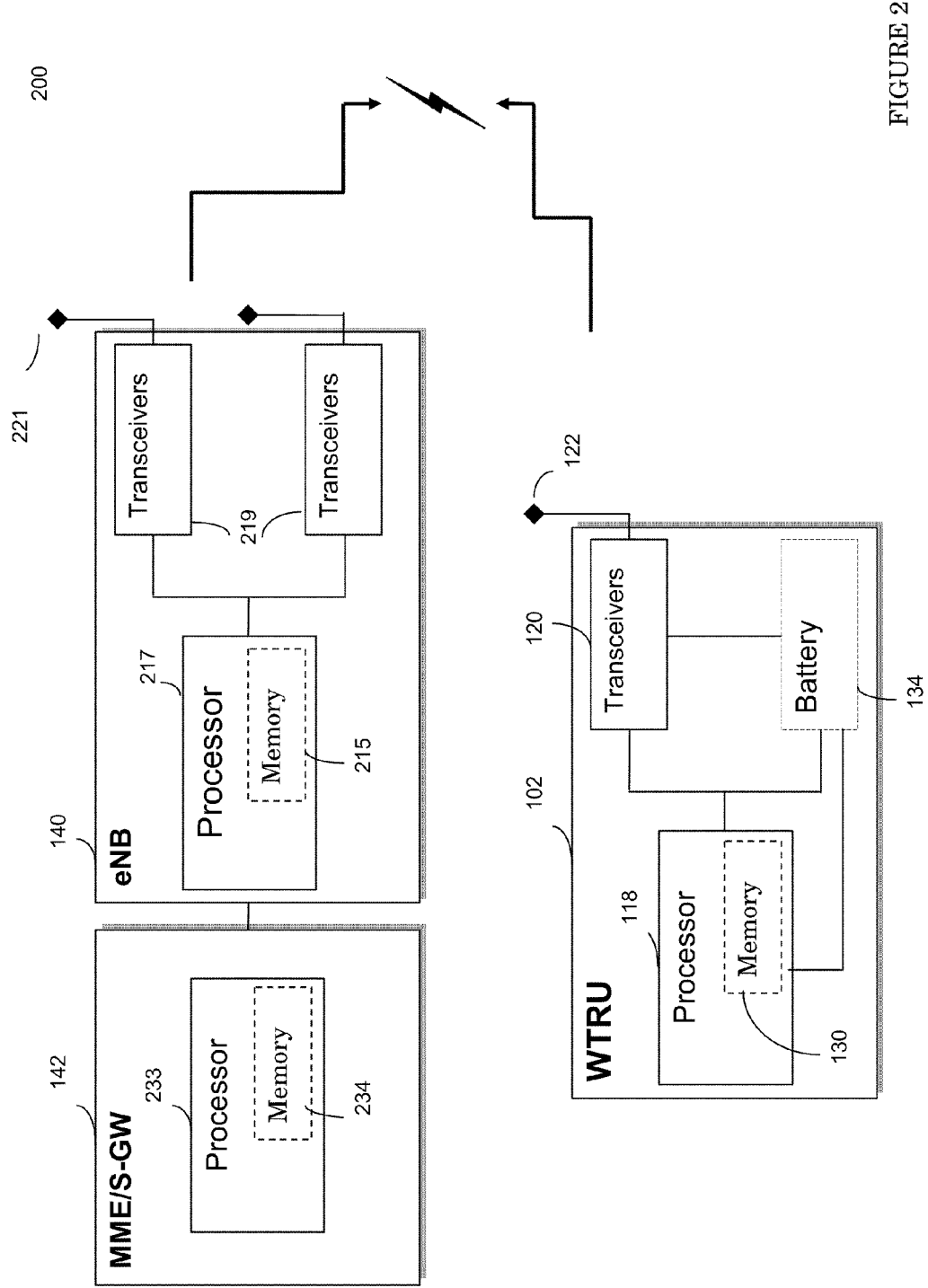
FIG. 2 depicts an illustrative block diagram of another wireless transmit/receive unit (WTRU), an evolved NodeB (eNB) and a mobility management entity/serving gateway (MME/S-GW) of the wireless communication system with which embodiments may be implemented.

FIG. 2 depicts another illustrative block diagram 200 of the WTRU 102, and the eNB 140, and the MME/S-GW 142/144 of the wireless communication system 100 of FIGS. 1A and 1C (or system 101 of FIG. 1). As shown in FIG. 2 (and FIG. 1B), the WTRU 102, the eNB 140, and the MME/S-GW 142/144 may be configured to transmit and receive MBMS messages and also may be configured to implement MCCH notification scheduling, MCCH notification contents, MCCH message transmission, and the like, for example.

In addition to the components that may be found in a typical WTRU, the WTRU 102 may include a processor 118 that may be linked to memory 130 (or 132), a transmitters and receivers together that may be designated as transceivers 120, and battery 134, and at least one antenna 122. The processor 118 may be configured to process MBMS messages and may be configured to implement MCCH notification scheduling, MCCH contents, and MCCH message transmission, for example. The transceivers 120 may be in communication with the processor 118 and antenna 122 to facilitate the transmission and/or reception of wireless communications. In case a battery 134 is used in WTRU 102, the battery may power the transceivers 120 and the processor 118, among other elements of the WTRU 102.

In addition to the components that may be found in a typical eNB, the eNB 140 may include a processor 217 that may be linked to memory 215, transceivers 219, and one or more antennas 221. The processor 217 may be configured to process MBMS messages and also may be configured to implement MCCH notification scheduling, MCCH contents, and MCCH message transmission. The transceivers 219 may be in communication with the processor 217 and antennas 221 to facilitate the transmission and/or reception of wireless communications. The eNB 140 may be connected to the Mobility Management Entity/Serving Gateway (MME/S-GW) 142/144 which may include a processor 233 that may be linked to memory 234.

Embodiments contemplate that an MCCH notification may be sent over a PDCCH with a MBMS specific M-RNTI. An MCCH notification may be received and/or monitored by MBMS capable WTRUs 102 that may require MBMS services. WTRUs 102 in both radio resource control (RRC) idle state and RRC connected state may receive and/or monitor the MCCH notification over the PDCCHs for the MBMS specific M-RNTI. The PDCCH may be on a non-MBSFN subframe or on a MBSFN-reserved subframe.

Embodiments contemplate that the MCCH notification on PDCCH by M-RNTI may be transmitted and/or received and/or monitored in MBSFN subframes simultaneously with one or more other PDCCH signals over MBSFN subframes. Embodiments contemplate that, at times, the M-RNTI may be accompanied on the PDCCH with the one or more other PDCCH signals, such as but not limited to, C-RNTI, C-RNTI-TPC, or the like. Simultaneous reception may provide for more flexibility in the scheduling of the M-RNTI as non-M-RNTI signals may not need to be excluded in the subframe that may include the M-RNTI.

Embodiments contemplate that the MCCH notification on PDCCH by M-RNTI may be transmitted and/or received and/or received and/or monitored by a WTRU 102 in the LTE paging subframes simultaneously with a paging RNTI (P-RNTI).

Embodiments contemplate that MCCH notification may be distributed in frame/subframes as notification occasions, or more simply "occasions." For example, an MCCH notification (M-RNTI) transmit and receive frame/subframe occasions may occur following the LTE paging occasions for individual WTRUs, e.g., SFN mod T=(T div N)*(WTRU_ID mod N) and i_s=floor (WTRU_ID/N) mod Ns, where the T is the default paging cycle length, N is derived with N=min (T, Nb), and Nb, Ns may be from the network signaling.

Alternatively, the transmit and receive frame/subframe occasions may occur, for connected WTRUs 102 monitoring the M-RNTI, as (for example):

MCCH occasion frame time=SFN mod (T div N)=0 and the MCCH occasion subframes={#9 if Ns=1, #4 & #9 if Ns=2, #0, #4, #5, #9 if Ns=4}.

Alternatively, embodiments contemplate that occasions may occur on the MBSFN subframes at the first subframe in the MCH subframe allocation pattern (MSAP) by the MBSFN subframeConfigList in SIB-2. Alternatively, embodiments contemplate that occasions may occur on the first subframe of the MCCH (or the MCH the MCCH is mapped over) MSAP allocation period or other periods related to MBMS operations, in case only one notification occasion may be defined. Alternatively, embodiments contemplate occasions may occur on the last subframe of the MCCH (or the MCH the MCCH is mapped over) MSAP allocation period or other periods related to MBMS operations, in case only one notification occasion may be defined.

Embodiments contemplate that, if more than one MCCH notification occasions (say $N_{M\text{-}RNTI}$) may be defined (and may either be predetermined or configured by the network) in an MCCH MSAP allocation period or other periods related to MBMS operations with $N_{MCCH\text{-}sf}$ subframes, the MCCH notification occasion distribution may be implemented in manners that may be described using variables K and R:

compute $K=\text{floor}(N_{MCCH\text{-}sf}/N_{M\text{-}RNTI})$; and compute $R=N_{MCCH\text{-}sf} \bmod N_{M\text{-}RNTI}$.

Figure 3:
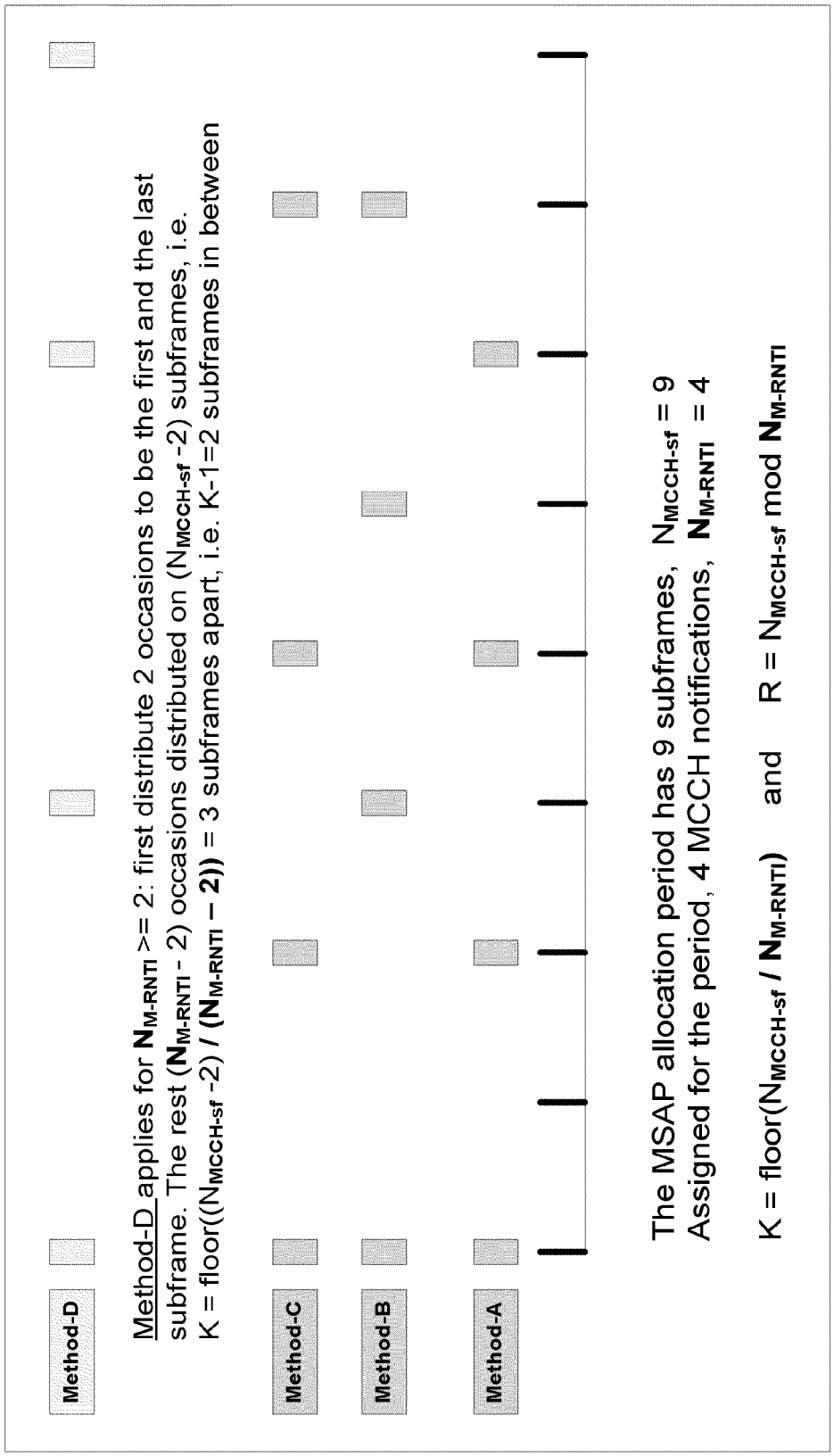
FIG. 3 illustrates exemplary MCCH notification occasions detected on PDCCH with M-RNTI consistent with embodiments.

FIG. 3 illustrates exemplary MCCH notification occasions detected on PDCCH with M-RNTI consistent with embodiments. Exemplary embodiments are described as follows and labeled as methods A-D for purposes of illustration. The method labels do not imply exclusivity or any other limitation. One or more of the illustrative methods may be combined, in part or in whole.

As illustrated as method A, the MCCH notification occasion may be distributed from the first subframe of the whole period with subsequent $N_{M\text{-}RNTI}-1$ notification of K subframes apart or (K−1) subframes in between.

As illustrated as method B, the first occasion may be distributed on the first subframe of the whole period; distribute the subsequent R occasions with K subframes may be in between (include towards the first occasion) and the rest of the occasions (K−1) subframes may be in between.

As illustrated as method C, the first occasion may be distributed on the first subframe of the whole period, distribute the last R occasions with K subframes in between (include towards the first occasion) and the rest of the occasions (K−1) subframes may be in between, in other words the subsequent $(N_{M\text{-}RNTI}-1-R)$ K−1 subframes may be in between and the last R occasions with K subframes may be in between.

As illustrated as method D, should $N_{M\text{-}RNTI}$ be greater or equal to 2, 2 occasions may be in the first and the last subframes of the period, the rest occasions may be distributed over $(N_{MCCH\text{-}sf}-2)$ subframes with $K=\text{floor}((N_{MCCH\text{-}sf}-2)/(N_{M\text{-}RNTI}-2))$ subframes apart or (K−1) subframes in between. Should $N_{M\text{-}RNTI}$ equal 2, the two occasions may be the first and the last subframe in the period.

The illustrated occasion distributions may be applied to any of the scheduling periods of the MBSFN scheduling entity where the M-RNTI scheduling may be applied. For example, embodiments contemplate scheduling in which subframes that a dynamic scheduling indicator (DSI) of the MCH over which the MCCH may be also mapped may be scheduled. Embodiments also contemplate scheduling in which subframes that the MCCH messages are scheduled at.

Embodiments also contemplate scheduling in which one or more MBSFN subframes may be assigned periodically by the E-UTRAN, with an Occasion Frame that may be equal to SFN mod Periodicity-of-the-basic-MSAP or SFN mod other-MBMS-period, that may be equal to FrameOffset. Also, an Occasion Subframe may be the first MBSFN subframe in that occasion frame according to the network signaling, for example.

Embodiments contemplate that a WTRU 102 may receive, intermittently, an indication of a change in control information over a control channel. The control channel may include an identifier and the control channel may be, by way of example and not limitation, a control channel for LTE.

Embodiments contemplate that occasions may be distributed on any MBSFN subframe period or non-MBSFN subframe period that may be scheduled for M-RNTI occasions with N M-RNTI occasions (for example) where, should N=1, that may be subject to rules:

The very first subframe of the MCCH (or the MCH the MCCH is mapped over) MSAP allocation period or other periods related to MBMS operations (if only one notification occasion may be defined); or The very last subframe of the MCCH (or the MCH the MCCH is mapped over) MSAP allocation period or other periods related to MBMS operations (if only one notification occasion may be defined).

Should N=2, that may be subject to rules:

In case N M-RNTI may be equal to (or greater than) 2, the 2 occasions may be distributed in the first and the last subframes of the period, the rest occasions (if any) may be distributed over ($N_{MCCH-sf}$–2) subframes with K=floor (($N_{MCCH-sf}$–2)/($N_{M-RNTI}$–2)) subframes apart or (K–1) subframes may be in between as shown in method-D of FIG. 3).

Should N>2, that may be subject to rules:

Distribute the MCCH notification occasion from the first subframe of the whole period with subsequent NM-RNTI–1 notification of K subframes apart or (K–1) frames in between as shown in method-A of FIG. 3; or Put the first occasion on the first subframe of the whole period, put the subsequent R occasions with K subframes in between (include towards the first occasion) and the rest of the occasions (K–1) subframes in between (as shown in method-B of FIG. 3); or put the first occasion on the first subframe of the whole period, put the last R occasions with K subframes in between (include towards the first occasion) and the rest of the occasions (K–1) subframes in between, i.e. put the subsequent ($N_{M-RNTI}$–1–R) K–1 subframes in between and the last R occasions with K subframes in between as shown in method-C of FIG. 3.

Embodiments contemplate methods of receiving a multimedia broadcast multicast service (MBMS) at a WTRU 102. The method may include receiving an MBMS control channel (MCCH) notification over a physical downlink control channel (PDCCH). The PDCCH may include an MBMS radio network temporary identifier (M-RNTI) and the PDCCH may be on an MBSFN subframe. The method may also include monitoring the MCCH notification on the MBSFN subframe(s) or non-MBSFN subframe(s).

Embodiments contemplate that the MCCH notification may be received periodically within one or more scheduling periods for the MBSFN subframe(s), such as those previously described, for example.

Embodiments contemplate that a wireless transmit/receive unit (WTRU) may be configured, at least in part, to receive an MBMS control channel (MCCH) notification over a physical downlink control channel (PDCCH). The PDCCH may include an MBMS-radio network temporary identifier (M-RNTI) and the PDDCH may be on an MBSFN subframe.

Embodiments further contemplate a wireless transmit/receive unit (WTRU), configured, at least in part, to receive an MBMS control channel (MCCH) notification periodically over a physical downlink control channel (PDCCH) in an MCCH message modification period. The MCCH message modification period may occur prior to an MCCH message modification period that may include a new MCCH message. The PDCCH may include an MBMS-radio network temporary identifier (M-RNTI) and the PDCCH may be on an MBSFN subframe.

Embodiments contemplate, from a network perspective, an evolved node-B (eNB) 140, configured, at least in part, to transmit an MBMS control channel (MCCH) notification over a physical downlink control channel (PDCCH). The PDCCH may include an MBMS-radio network temporary identifier (M-RNTI) and the PDCCH may be on an MBSFN subframe. The eNB 140 may be further configured to transmit the MCCH notification periodically within a scheduling period for the MBSFN subframe(s). In addition, embodiments contemplate that the eNB 140 may be further configured to transmit the MCCH notification in an MCCH message modification period that may occur prior to an MCCH message modification period that may include a new MCCH message.

Embodiments also contemplate an evolved node-B (eNB) 140 configured, at least in part, to transmit an MBMS control channel (MCCH) notification periodically over a physical downlink control channel (PDCCH) in an MCCH message modification period. The MCCH message modification period may occur prior to an MCCH message modification period that may include a new MCCH message. The PDCCH may include an MBMS-radio network temporary identifier (M-RNTI) and the PDCCH may be on an MBSFN subframe.

Embodiments contemplate that, upon power-on, the LTE MBMS capable WTRUs 102 that may need to receive MBMS service may obtain the configuration information of the MCCH notification and the MCCH message occasion information from the system information. In an idle state, the WTRUs 102 may monitor M-RNTI, possibly together with the P-RNTI, at the WTRU's 102 individual paging occasions (e.g., the paging frame) and/or the MBSFN subframe as described previously. In a connected state, the WTRUs 102 may monitor the M-RNTI at any MCCH notification occasions defined above, based on the WTRU's 102 own requirements.

Embodiments contemplate that, for power-saving purposes for example, the MBMS capable WTRUs 102 may monitor any MCCH notification occasions described previously when it is downlink active, e.g. the discontinuous reception (DRX) mode WTRUs 102 could perform the monitoring of the M-RNTI in a "DRX-on-duration time plus the time when one or more of the active timers are running" if the WTRU specific DRX downlink active time overlaps any one of the MCCH notification occasion frames and subframes.

WTRUs 102 that may already be receiving MBMS services could monitor the MCCH notifications over the MCCH notification occasions in MBSFN subframes as described previously. The WTRUs 102 may be needed or may be required to acquire the MCCH notification at least once per MCCH message modification period (MP) at the specified MCCH notification occasions.

Embodiments contemplate that the occurrence of the MCCH notification may indicate an upcoming new MCCH message from the next modification period. The E-UTRAN may only send the relevant MCCH notifications in the first MP, or one or more MPs, prior to the coming of the new MCCH message. At the new message MP, the E-UTRAN may not be expected to send MCCH notifications for the current MCCH message unless there may be an immediate change of MCCH message again in the next message MP.

The MCCH notification may bear a value-tag to identify the associated MCCH message, so that in an MBSFN, if the WTRU 102 changes cell to another mixed cell within the same MBSFN, the value tag of the target cell's MCCH notification could tell whether a new retrieval of the MCCH message (and its MBMS service information) may be necessary.

Embodiments contemplate that there is a possibility that the MCCH notification may be only sent when there is a change of the MCCH message in the next MP. If there is no change, the M-RNTI MCCH notification may not come for quite some period, and the WTRUs 102, especially the newly powered-on WTRU 102 or newly handed-over WTRUs 102 may not have the information to acquire the current ongoing MCCH messages without the MCCH notification (if the MCCH message location may only be specified in the MCCH notification).

Newly powered on WTRUs 102 may read an MCCH message with the known fixed parameters to know the current ongoing MBMS services and configurations to start the reception the MBMS services as soon as possible.

To assist the newly powered on or transitioned WTRUs, embodiments contemplate that the MCCH message may be defined with a set of fixed encoding and transmission parameters at the physical level, for example. This may include a fixed modulation scheme (e.g. QPSK), fixed FEC of encoding (e.g. Turbo encoding) and coding rate (e.g. ⅓ or ½ or etc), fixed rate-matching parameters, a fixed maximum number of MCCH message physical RBs (max total number of RBs, e.g. 12 RBs) and fixed MAX-RB-size of the MCCH message content (e.g. 9600 bits) and a fixed starting address (e.g. the first available physical resource block (PRB) in an MBSFN subframe—$PRB_0$, for example).

The MCCH message at the RRC level, in the beginning, may have the parameter MCCHMesgLenInd indicating the real size of the MCCH message contents. The MCCH message may (perhaps by definition) never be greater in size than the "Fixed number of MCCH message RBs" can hold by the fixed encoding parameters defined. The fixed parameters could either be predetermined or may be signaled through the system information block (SIB).

When the MCCH message is transmitted, it may be encoded as a full-sized MCCH message content (e.g. 9600 bits) using the above specified parameters, except that the real MCCH message content may not be the defined fixed MAX-RB-size but may be less (e.g. 7200 bits—indicated by the MCCHMesgLenInd in the MCCH message, or alternatively in the MAC-subheader Length field). In this case, the rest padding content (e.g. the 2400 bits=MAX-size−MCCHMesgLenInd) input may be taken as the NULL values (e.g. 0s).

Embodiments contemplate that at the receiving end, the WTRU may take the MBSFN subframe with the first max-RB-size number of RBs (e.g. 12 RBs) for the MCCH message and may decode the MCCH message using the other fixed parameters (e.g. QPSK, turbo ⅓, 9600 bits, . . . ), then may use the decoded MCCH message parameter MCCHMesgLenInd to keep the real MCCH message content (e.g. 7200 bits) and may discard the un-real contents (e.g. 9600−7200=2400 bits). By doing so, the WTRU 102 may decode the MCCH message at any time and start receiving MBMS based on the current MCCH message. However, the system may inefficiently use precious resources. No real content in the MCCH notification by M-RNTI may be required.

To address the resource inefficiencies (such as the non-real portion of the encoded part—e.g. 2400 bits above), alternative embodiments contemplate that, for example, the real MCCH message size (the frequency resource size) may be specified in the MCCH notification carried over the PDCCH with the M-RNTI (e.g., not fixed on transmission). The E-UTRAN may encode the MCCH message content with the real number of resource blocks (e.g. 9 RBs).

For the newly powered-on WTRUs 102 or other WTRUs 102 having not acquired the MCCH notification, the WTRUs 100 may still be able to decode the MCCH using the same manner described previously, i.e. decode the MCCH in the beginning of the subframe with the max-RB-size (e.g. 12 RBs) but may instead use the decoded MCCHMesgLenInd to discard the non-real contents. For the WTRUs 102 having acquired the MCCH notification they may know exactly the number of the MCCH message resource blocks and they may decode the MCCH message according to the size specified in the MCCH notification. By doing so, the system resources are used more efficiently, as most of the WTRUs 102 may decode the MCCH message properly while only very few WTRUs 102 may do some extra decoding, but can still keep the contents received correct. The MCCH notification by M-RNTI may be required to carry the MCCH message size.

Embodiments contemplate that MCH data may still be encoded to the rest of the MBSFN subframe with its own encoding rules and the WTRU may be able to receive and decode the MCH data after determining the MCCH message size.

Embodiments also contemplate that the PHY layer may also use either the default MCCH message max-RB-size and/or the MCCH message resource block size in the MCCH notification to skip the reception of the MCCH message and retrieve the MCH data only. Embodiments further contemplate that a value-tag may also be put in the MCCH message. This value-tag may identify the version of the MCCH service and control information related to the MBMS service, and it can bear the significance over the cell and MBSFN-area boundary.

Figure 4:
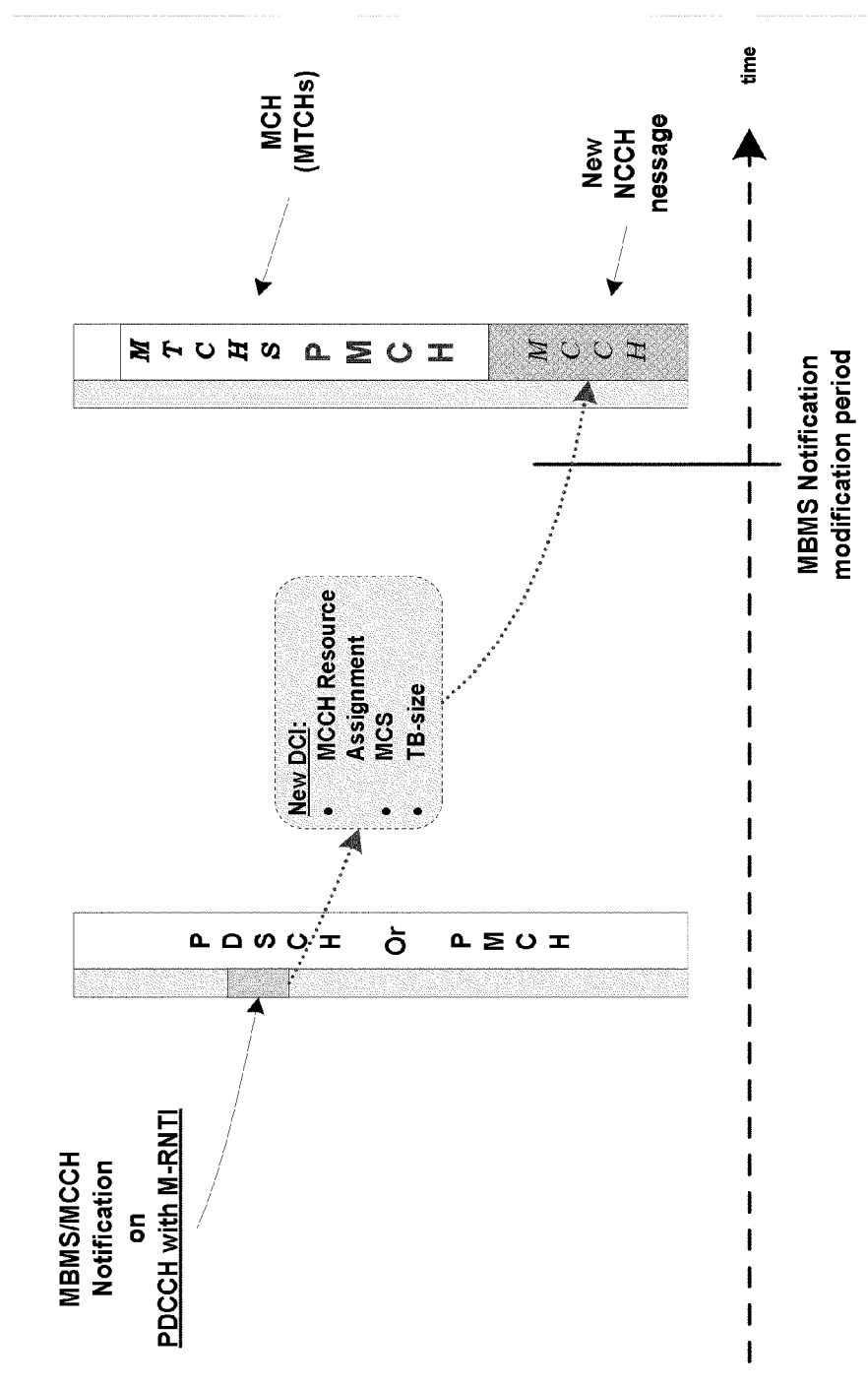
FIG. 4 illustrates an exemplary MCCH Notification (M-RNTI) detection, which indicates a new MCCH message in a subsequent MCCH modification period consistent with embodiments.

Referring to FIG. 4, embodiments contemplate that for MCCH notification on the PDCCH with M-RNTI, the MBMS capable WTRUs 102 may check, receive, and/or monitor the MCCH notification over PDCCHs with the M-RNTI. The MCCH notification, if detected via M-RNTI, may indicate that a new MCCH message (with respect to none or to a currently transmitted MCCH message within the modification period boundary) about the MBMS service announcement, MBMS service mapping, and/or other important MBMS service control information may be transmitted in a MBSFN subframe, perhaps after the current MBMS modification period boundary. The notification may be used to change the configuration information about the current MCCH message.

As illustrated in FIG. 4, embodiments contemplate that the PDCCH transmitting the MCCH notification could be on a regular non-MBSFN subframe or on a MBSFN-subframe, as long as it may be scrambled with a public identity specifically assigned for MBMS application, for example the M-RNTI.

The MCCH notification may inform the WTRUs 102 about the forthcoming of the new MCCH message and the configuration information of the new MCCH message in the next modification period. Thus, the MCCH notification contents (downlink control information (DCI) or its equivalent for example) may contain no information about the immediate Physical Downlink Shared Channel (PDSCH) space. Instead the MCCH notification may contain the information about the MCCH messages sometime later.

In addition to the M-RNTI, embodiments contemplate that the notification may also carry the additional information to facilitate the new MCCH message that will be transmitted in the new MP. For example, the MCCH notification (identified by the M-RNTI) may carry the radio resource assignment information of the new MCCH message. This may be the resource location for all the MCCH messages sent from the new modification period until the next explicit change. The MCCH message may be sent in the beginning of the MBSFN-subframe (in this case the resource assignment information can be omitted) or a special radio resource location may also be specified. The number of RBs (PRB or VRB) may be changed.

Figure 4A:
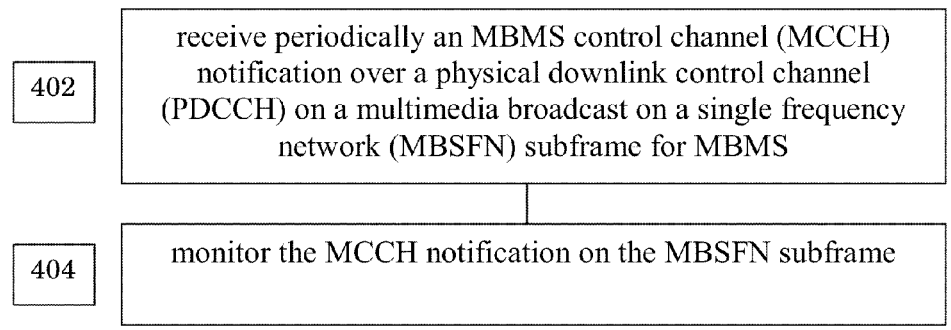
FIG. 4A illustrates an exemplary flowchart of receiving an MCCH Notification consistent with embodiments.

Referring to FIG. 4A, embodiments contemplate methods that may include, at 402, receiving periodically an MBMS control channel (MCCH) notification over a physical downlink control channel (PDCCH) on a multimedia broadcast on a single frequency network (MBSFN) subframe for MBMS. The MCCH notification may be received periodically on the scheduled occasions on the MBSFN subframe. Also, methods may also include, at 404, monitoring the MCCH notification (M-RNTI) on the MBSFN subframe. The MCCH notifications may be monitored periodically on the scheduled occasions on the MBSFN subframe. The elements recited here and reflected in FIG. 4A are not contemplated as being exclusive and each respective element may be combined with other elements, including those not recited here or shown in FIG. 4A, in whole or in part. Also, the respective elements recited here and reflected in FIG. 4A are not contemplated as being necessarily performed, either individually or in combination.

The size information of the new MCCH message, which may be the size of the Resource Blocks (or the size of the MCCH message), may be included in the MCCH notification. The modulation and coding scheme of the new message may be included, which may only be used for the new MCCH message subsequently, independent of what the MCS of other data over the same subframe.

Embodiments contemplate that the MCCH notification may also contain some application specific elements, such as an indicator that may indicate whether this current MCCH notification applies to the next MP or not.

Also, the MCCH notification may contain a value-tag that may indicate the version of the forthcoming new MCCH message within the MBSFN-area. The value-tag value could either be an integer value for the version of the new MCCH message, or the value could be a combination for both the message version and the MBSFN-area-Id; By the value-tag, WTRUs 102 have obtained the new MCCH notification could stop acquiring the notification until the next MP.

The M-RNTI DCI may have a field (such as a counter, for example) indicating after the immediate next MP, the number of MPs after which the new MCCH message would start (the default may be the next MP, value 0 for example) as a parameter delay-start-MP. The delay-start-MP may change from MP to MP, decrementing per MP. A value 3 may mean there are 3 MPs after the next MP, a value 2 means there 2 MPs after the next MP, and the like, for example.

Embodiments contemplate that the MCCH message may be encoded into the radio resource location indicated by one or more of these application specific elements.

Embodiments contemplate that considering the MBMS capability may be a WTRU 102 capability, which not all WTRU 102 may implement, a frequent MBMS-SIB change caused by MBSFN-area coverage change, and the change notification, it may be useful not to affect WTRUs 102 that may be unicast only for information that may be irrelevant to such WTRUs 102. In such situations, a distinct signaling method for MBMS-SIB change notification specifically for MBMS capable WTRUs 102 may be useful.

Embodiments contemplate that the MBMS-SIB change notification information may be included in the M-RNTI contents so that only the MBMS capable WTRUs may be notified of the change while unicast WTRUs 102 would not be affected. The MBMS-SIB change notification in the DCI could be a 1-bit quantity, its initial presence in the DCI may indicate the new MBMS-SIB may be broadcast from the next system information modification period.

Embodiments contemplate that as a default, the bit presence may last only N (where N may be a predetermined number in the standards or signaled by the network) system information MPs or MCCH MPs and returns to absence. Within this period, WTRUs 102 that may have already acquired the new MBMS-SIB may ignore the bit presence. The re-appearance of the bit may signal another new MBMS-SIB change again.

Embodiments contemplate that the MCH (hence the MTCHs mapped over this particular MCH) data scheduled (by DSI for example) over the same subframe may be transmitted together with the MCCH message. The MCCH message may take the priority over the resource location allocation, e.g., the MTCH (with some or all of the MBMS services) data may be encoded into the resource regions that MCCH message may not be used.

Should the DCI radio resource assignment information indicates that the MCCH message may be encoded in the beginning of the MBSFN subframe with the indicated size information, then the MTCH data may be encoded in the next RB (immediate next RB or the RB rounded up with module 4 from the MCCH message, for example).

Should the DCI radio resource assignment information indicates that the MCCH message may be encoded in a specific location (a PRB for example) in the subframe resource, then the MTCH data may be encoded from either the next PRB after the ending of the MCCH message (if the higher addressed resources can take the MCH data), or start in the beginning of the subframe resource, skipping the MCCH message, and restart at the next RB after the end of the MCCH message.

Figure 4B:
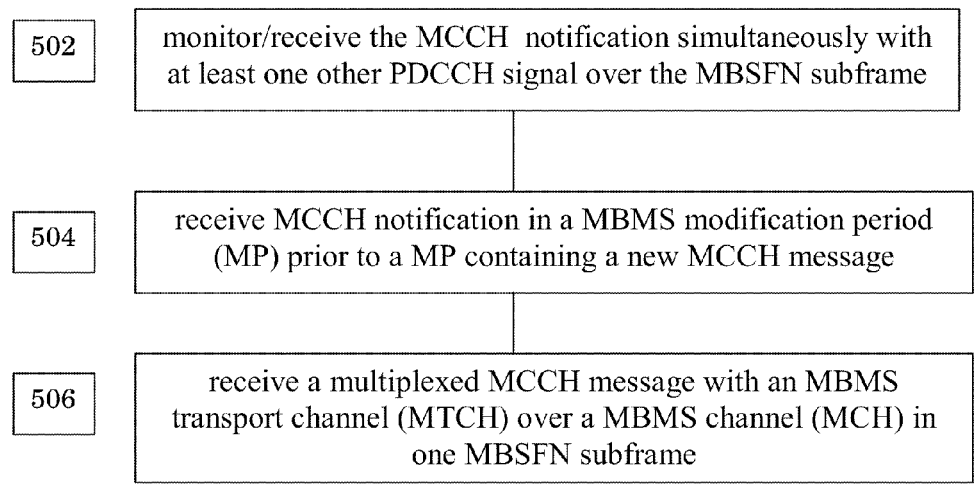
FIG. 4B illustrates an exemplary flowchart of receiving an MCCH Notification consistent with embodiments.

Referring to FIG. 4B, embodiments contemplate methods that, at 502, may include monitoring and/or receiving the MCCH notification simultaneously with at least one other PDCCH signal over the MBSFN subframe. At 504, the methods contemplate receiving a MCCH notification in a MBMS modification period (MP) prior to a MP containing a new MCCH message. Also, at 506, the methods may include receiving a multiplexed MCCH message with an MBMS transport channel (MTCH) over a MBMS channel (MCH) in one MBSFN subframe. The elements recited here and reflected in FIG. 4B are not contemplated as being exclusive and each respective element may be combined with other elements, including those not recited here or shown in FIG. 4B, in whole or in part. Also, the respective elements recited here and reflected in FIG. 4B are not contemplated as being necessarily performed, either individually or in combination.

Figure 5:
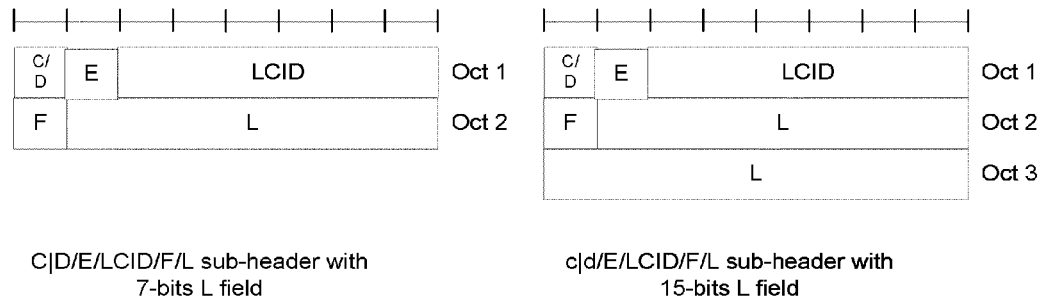
FIG. 5 illustrates a data plane MBMS medium access control (MAC) service data unit SDU header consistent with embodiments.

Referring to FIG. 5, embodiments contemplate that the media access control packet data unit (MAC PDU) structure may be impacted by the MBMS specific operations. The data-plane MAC service data unit (SDU) may have larger logical channel identification (LCID) space, e.g. a 6-bit LCID for a MTCH in a MCH for MBMS. The change may be the first bit the C/D field to distinguish the C-plane MAC SDU from a data-plane MAC SDU. A value '1' is for 'C', C-plane MAC SDU; a value '0' is for 'D', data-plane MAC SDU. For a data-plane PDU, the C/D field may be indicated as 'D'.

Figure 6:
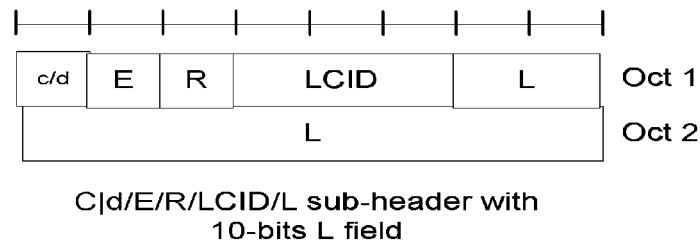
FIG. 6 illustrates an MBMS control plane (C-plane) MAC SDU header consistent with embodiments.
Figure 7:
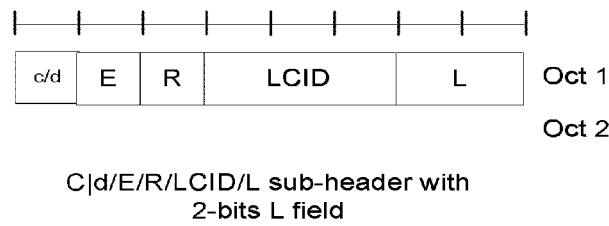
FIG. 7 illustrates a fixed sized MAC-CE header format for MBMS consistent with embodiments.

The MAC SDU format for the control-plane, with the MCCH messages SDU, the MSCH message SDU may look like the illustration of FIG. 6. Since there may only be one MCCH and one MSCH in the cell, there may be no need for large spaced LCID with respect to MCCH and MSCH. There may be one or more of MBMS related MAC-CEs, therefore a 2-bit or a 3-bit LCID field (3 bit shown in FIG. 6) can be used for the identification of the MCCH, MSCH and individual MAC-CEs. For a C-plane SDU, the C/D field is indicated as 'C', i.e. a value of '1', as above defined.

The L field is expanded to 10-bit (could be 11 if needed—taking one bit from the R field) so it could address 1023 octets, i.e. about 8000 bits of MCCH message contents or MSCH contents. If more space is needed, an eleven (11) bit length indicator may be used. There is no need for the 'F' bit to extend the length field to 15 bits.

In both C-plane and D-plane SDUs, the 'E' field may still keep the regular MAC SDU definition, i.e. indicating if there may be another header after this. If the MAC-CE for MBMS needs to be variably sized, the format in FIG. 6 can be used. But if the MAC-CE for MBMS is fixed sized, the header format in FIG. 7 may be used.

Figure 8:
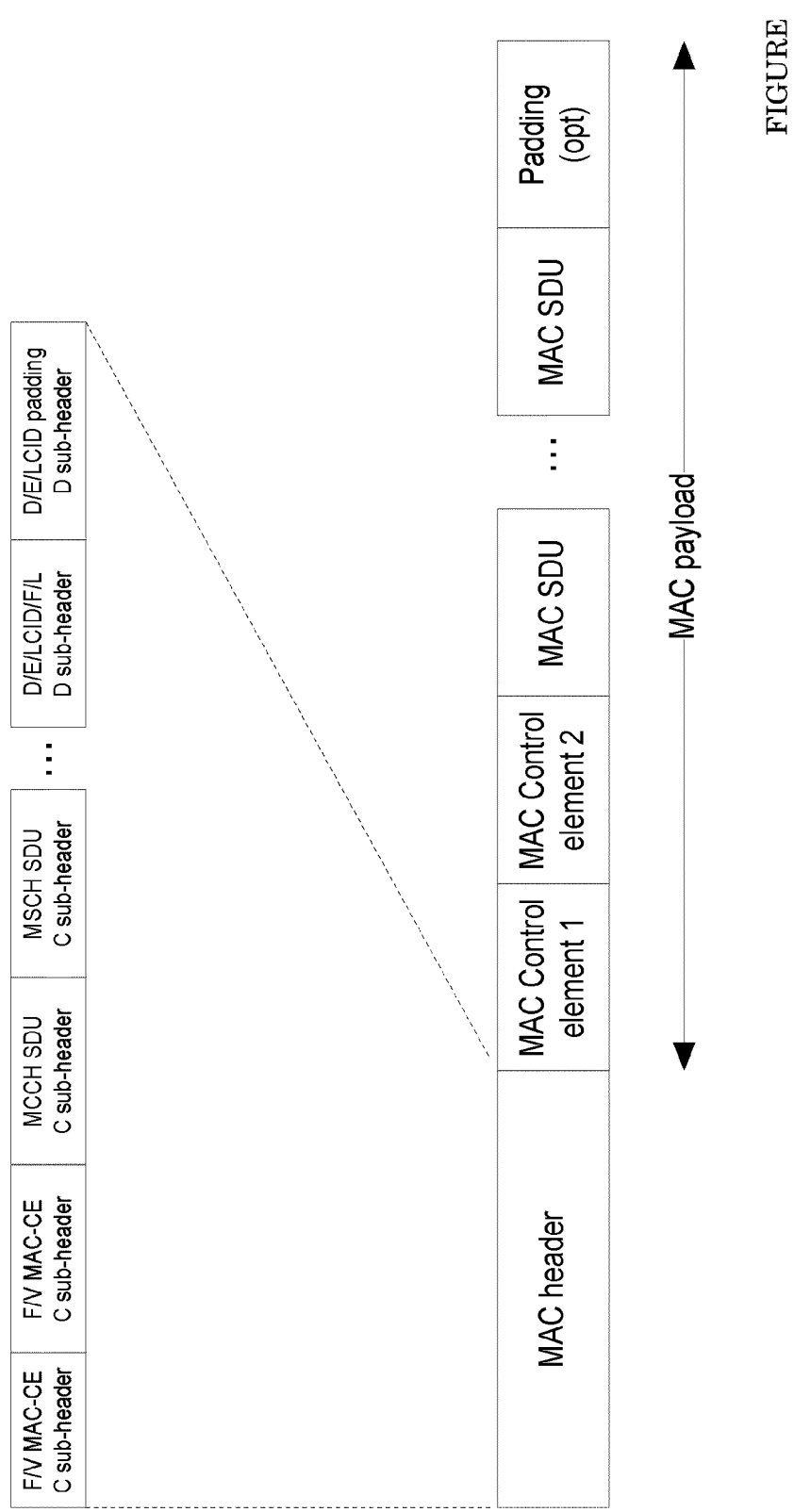
FIG. 8 illustrates a combined MBMS MAC protocol data unit (PDU) for MAC-CE, C-plane and data-plane (D-plane) SDUs consistent with embodiments.

Embodiments contemplate that Combined C/D MBMS MAC-PDU may have the format shown in FIG. 8 (e.g., the C-plane SDUs in the front with the D-plane SDUs in the rear with padding last).

Embodiments contemplate that when a WTRU 102 may need to acquire the new MCCH message only once over repeatedly transmitting MCCH messages, as well as eliminate the unnecessary handling the unwanted MCCH message, the PHY layer may, at the higher layer control or signaling, skip reading the MCCH Message.

Alternatively, the WTRU 102 may provide separate C-plane MAC-PDU and D-plane MAC-PDU to the WTRU MAC simultaneously for MBMS when the MCCH message and MTCH data (in a MCH) may be encoded on the same MBSFN subframe; or when the MCCH message and/or the MSCH message and/or the MAC-CE (i.e. the DSI dynamic scheduling Indicators) may be encoded with the MTCH data (in a MCH). Separate C-plane or D-plane MAC-PDUs may use a MAC-PDU format shown in FIG. 8, except the SDUs from the other plane may not be included, e.g. a separate C-plane PDU may not have the D-plane SDUs in, but may have the padding if necessary.

Figure 4C:
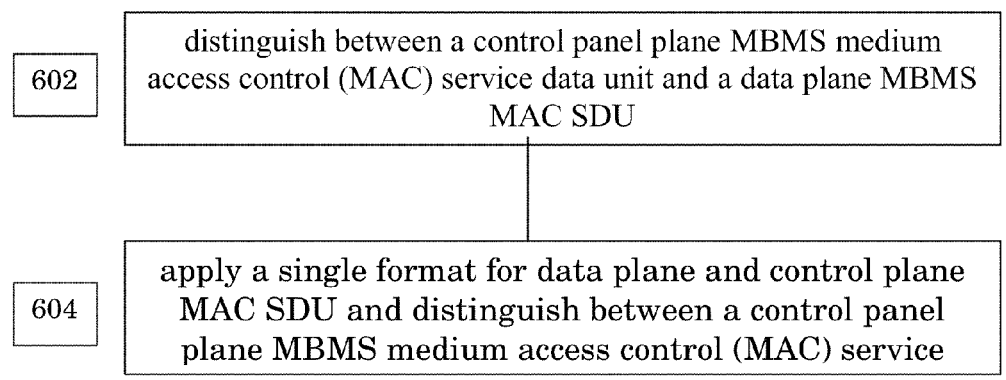
FIG. 4C illustrates an exemplary flowchart of distinguishing between a control panel plane MBMS medium access control (MAC) service data unit and a data plane MBMS MAC SDU consistent with embodiments.

Referring to FIG. 4C, embodiments contemplate methods that may include, at 602, distinguishing between a control panel plane MBMS medium access control (MAC) service data unit and a data plane MBMS MAC SDU. Also, at 604, the method may include applying a single format for data plane and control plane MAC SDU and distinguishing between a control panel plane MBMS medium access control (MAC) service. The elements recited here and reflected in FIG. 4C are not contemplated as being exclusive and each respective element may be combined with other elements, including those not recited here or shown in FIG. 4C, in whole or in part. Also, the respective elements recited here and reflected in FIG. 4C are not contemplated as being necessarily performed, either individually or in combination.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

While the various embodiments have been described in connection with the embodiments of the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of receiving a multimedia broadcast multicast service (MBMS) at a wireless transmit/receive unit (WTRU), the method comprising:

receiving an MBMS control channel (MCCH) notification over a physical downlink control channel (PDCCH), the PDCCH including an MBMS radio network temporary identifier (M-RNTI) and the PDCCH being on a multimedia broadcast on a single frequency network (MBSFN) subframe for MBMS, the MCCH notification being scheduled periodically within a notification period for the MBSFN subframe, and a system frame number (SFN) modulus of a periodicity of the notification being equal to an offset of the notification; and monitoring the MCCH notification on the MBSFN subframe.

2. The method of claim 1, wherein the WTRU receives, at least once, the MCCH notification simultaneously with at least one other PDCCH signal over the MBSFN subframe.

3. The method of claim 1, wherein one or more MCCH notification occasions are distributed within the notification period, the notification period including at least one of an MBMS Subframe Allocation (MSAP) Period or other allocation period, and the MCCH notification occasions being distributed among one or more subframes of the MSAP period or the other allocation period.

4. The method of claim 2, wherein the monitoring the MCCH notification includes monitoring the MCCH notification over the one or more MCCH notification occasions.

5. The method of claim 1, wherein the MCCH notification is received in an MCCH message modification period occurring prior to an MCCH message modification period including a new MCCH message.

6. The method of claim 1, wherein the MCCH notification includes a value-tag corresponding to an MCCH message, the value-tag identifying the MCCH message, and the identification providing a cell in communication with the WTRU with information regarding whether the MCCH message has been retrieved.

7. The method of claim 1, wherein the MCCH Notification includes an indicator, the indicator indicating an MBMS-SIB change.

8. The method of claim 1, further including receiving a fixed parameter MCCH message, the fixed parameter MCCH message including information for acquiring an MCCH message without utilizing the MCCH notification.

9. A wireless transmit/receive unit (WTRU), the WTRU being configured, at least in part, to receive a multimedia broadcast multicast service (MBMS) control channel (MCCH) notification over a physical downlink control channel (PDCCH), the PDCCH including an MBMS-radio network temporary identifier (M-RNTI) and the PDDCH being on a multimedia broadcast on a single frequency network (MBSFN) subframe for MBMS, the MCCH notification scheduled periodically within a notification period for the MBSFN subframe, and a system frame number (SFN) modulus of a periodicity of the notification being equal to an offset of the notification.

10. The WTRU of claim 9, being further configured to receive the MCCH notification in an MCCH message modification period occurring prior to an MCCH message modification period including a new MCCH message.

11. The WTRU of claim 9, being further configured to receive the MCCH notification simultaneously with at least one other PDCCH signal over the MBSFN subframes.

12. The WTRU of claim 9, wherein one or more MCCH notification occasions are distributed within the notification period, the notification period including at least one of an MBMS Subframe Allocation (MSAP) Period or other allocation period, and the MCCH notification occasions being distributed among one or more subframes of the MSAP period or the other allocation period.

13. The WTRU of claim 12, being further configured to monitor the MCCH notification over the one or more MCCH notification occasions.

14. The WTRU of claim 9, wherein the MCCH notification includes a value-tag corresponding to an MCCH message, the value-tag identifying the MCCH message, and the identification providing a cell in communication with the WTRU with information regarding whether the MCCH message has been retrieved.

15. An evolved node-B (eNB), configured, at least in part, to transmit a multimedia broadcast multicast service (MBMS) control channel (MCCH) notification over a physical downlink control channel (PDCCH), the PDCCH including an MBMS-radio network temporary identifier (M-RNTI) and the PDCCH being on a multimedia broadcast on a single frequency network (MBSFN) subframe for MBMS, the MCCH notification scheduled periodically within a notification period for the MBSFN subframe, and a system frame number (SFN) modulus of a periodicity of the notification being equal to an offset of the notification.

16. The eNB claim 15, being further configured to:
transmit the MCCH notification in an MCCH message modification period occurring prior to an MCCH message modification period including a new MCCH message.

17. The eNB of claim 15, being further configured to transmit, at least once, the MCCH notification simultaneously with at least one other PDCCH signal over the MBSFN subframe.

18. The eNB of claim 15, being further configured to allocate one or more MCCH notification occasions within the notification period, and wherein the notification period includes at least one of an MBMS Subframe Allocation (MSAP) Period or other allocation period, the MCCH notification occasions being distributed among one or more subframes of the MSAP period or the other allocation period.

* * * * *